Figure 1:
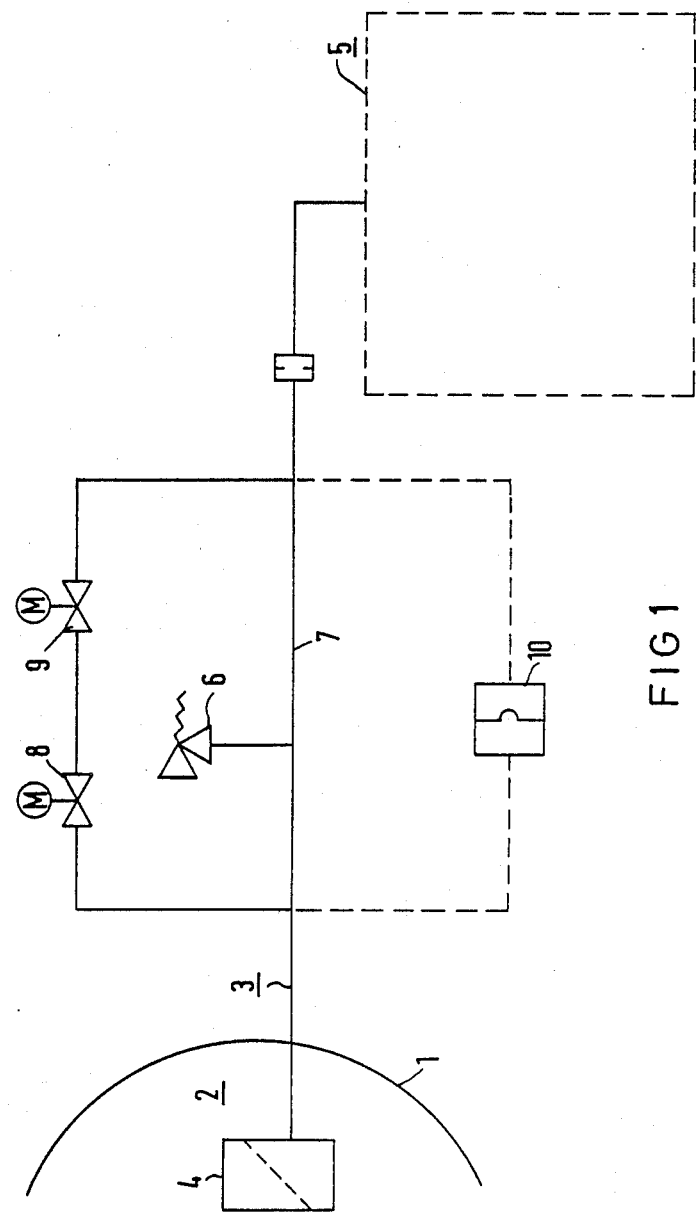

United States Patent [19]

Eckardt

[11] Patent Number: 4,863,677
[45] Date of Patent: Sep. 5, 1989

[54] NUCLEAR POWER PLANT HAVING A CONTAINMENT

[75] Inventor: Bernd Eckardt, Bruchköbel, Fed. Rep. of Germany

[73] Assignee: Siemens Aktiengesellschaft, Berlin and Munich, Fed. Rep. of Germany

[21] Appl. No.: 118,751

[22] Filed: Nov. 5, 1987

[30] Foreign Application Priority Data

Nov. 6, 1986 [DE] Fed. Rep. of Germany ....... 3637795

[51] Int. Cl.$^4$ ............................................ G21C 19/42
[52] U.S. Cl. .................... 376/313; 376/310;
376/314; 376/316; 55/DIG. 9; 261/DIG. 10;
261/DIG. 76; 261/DIG. 54
[58] Field of Search ............... 376/313, 314, 316, 283,
376/310; 261/77, 21, 23.1, 109, 122, DIG. 10,
DIG. 76, DIG. 54; 55/255, 17, DIG. 9

[56] References Cited

U.S. PATENT DOCUMENTS

| 464,779 | 12/1891 | Reichhelm et al. | 55/255 |
|---|---|---|---|
| 2,883,169 | 4/1959 | Daman | 261/77 |
| 3,063,686 | 11/1962 | Irvin | 261/21 |
| 3,332,214 | 7/1967 | Huppke | 261/DIG. 54 |
| 3,385,197 | 5/1968 | Greber | 261/109 |
| 3,459,635 | 8/1969 | Bevilacqua et al. | 376/313 |
| 3,482,377 | 12/1969 | Walrave | 376/314 |
| 3,676,982 | 7/1972 | Price | 55/255 |
| 3,756,580 | 9/1973 | Dunn | 261/DIG. 54 |
| 3,894,853 | 7/1975 | Pike | 261/DIG. 54 |
| 4,022,655 | 5/1977 | Gaouditz et al. | 376/283 |
| 4,151,689 | 5/1979 | Schabert | 52/169.5 |
| 4,210,614 | 7/1980 | Kleimola | 376/313 |
| 4,304,665 | 12/1981 | Hines | 261/77 |
| 4,347,067 | 8/1982 | Homer | 261/DIG. 54 |
| 4,557,879 | 12/1985 | Weber | 261/122 |
| 4,567,016 | 1/1986 | Tong | 376/283 |
| 4,610,840 | 9/1986 | Leach | 376/283 |
| 4,661,312 | 4/1987 | Schweiger | 376/283 |
| 4,687,626 | 8/1987 | Tong | 376/283 |
| 4,698,202 | 10/1987 | Wachholz et al. | 376/300 |
| 4,699,755 | 10/1987 | Dagard et al. | 376/313 |

FOREIGN PATENT DOCUMENTS

| 3212265 | 10/1983 | Fed. Rep. of Germany . | |
| 0226896 | 12/1984 | Japan | 376/314 |
| 1090093 | 5/1986 | Japan | 376/313 |
| 1202252 | 8/1970 | United Kingdom | 376/314 |

*Primary Examiner*—Donald P. Walsh
*Attorney, Agent, or Firm*—Herbert L. Lerner; Laurence A. Greenberg

[57] ABSTRACT

A nuclear power plant includes a containment for containing activity carriers. An outlet in the form of an excess pressure safety device leads out of the containment. A filter connects the outlet to the atmosphere. The filter includes a container, a washing fluid disposed in the container, a Venturi scrubber being integrated in the container and connected to the outlet, the container having an upper region with a gas outlet, and a stack connected to the gas outlet.

9 Claims, 5 Drawing Sheets

NUCLEAR POWER PLANT HAVING A CONTAINMENT

The invention relates to a nuclear power plant having a containment for containing activity carriers, the containment having an outlet in the form of an excess pressure safety device leading out of the containment and through a filter into the atmosphere.

A nuclear reactor of this type is known, for example, from German Patent DE-PS 26 34 356, corresponding to U.S. Patent No. 4,151,689. The containment provided therein is in the form of a steel sphere that is enclosed by a concrete building. Outlet openings that can be closed off by an excess pressure valve are provided in the concrete building. Lines lead from the outlet openings into certain zones within a mound of soil that rises above the concrete building. A pile of coarse gravel in the mound is intended to carry out filtering and steam condensation, in the event of a malfunction in the interior of the concrete building that threatens to exceed its bursting strength. Outlet lines in which safety valves assure a certain response pressure also lead out of the containment. The outlet lines lead either into the concrete building or directly into the layer of gravel located outside the concrete building, so that pressure relief for the containment can be provided without damage to the integrity of the annular space between the containment and the concrete building.

It is a disadvantage of this type of device that a mound of soil must be used. A particular problem in this respect is that the outlet medium includes aerosols, which because of their small size, on the order of approximately 1 $\mu$m, are difficult to contain, especially if only one filter with a narrowly limited volume is available.

It is accordingly an object of the invention to provide a nuclear power plant having a containment, which overcomes the hereinafore-mentioned disadvantages of the heretofore-known devices of this general type and which provides relief of the containment even if there is no mound of soil, enabling widely scattered distribution for receiving the outlet medium from the containment.

With the foregoing and other objects in view there is provided, in accordance with the invention, a nuclear power plant, comprising a containment or containment shell for containing activity carriers, an outlet in the form of an excess pressure safety device or valve leading out of the containment, and a filter connecting the outlet to the atmosphere, the filter including a container, a washing fluid disposed in the container, a Venturi scrubber being integrated in or with the container and connected to the outlet, the container having an upper region or top with a gas outlet, and a stack connected to the gas outlet.

According to the invention, while the existing pressure of the outlet medium is utilized in a Venturi scrubber, generally referred to as an atomizer, that is covered with washing fluid, the outlet medium is accelerated out of the containment in such a way that maximally effective aerosol moistening occurs passively, that is without auxiliary energy. Furthermore, iodine absorption can also be attained with the surrounding washing fluid that is aspirated at the same time. This can be further promoted by introducing suitable chemicals, such as alkaline substances, into the washing fluid.

The aspiration of the washing fluid into the Venturi scrubber takes place not only by means of the negative pressure generated therein, but also by means of the pressure of the liquid column of washing fluid above the Venturi scrubber.

In accordance with another feature of the invention, there is provided a jet pump upstream of the Venturi scrubber for feeding the washing fluid to the Venturi scrubber. A jet pump can advantageously be used for aspirating and precompressing the washing fluid if an even greater pressure difference is desired to increase the feed quantity.

In accordance with a further feature of the invention, there is provided a mist collector disposed in the washing fluid in the container, the mist collector having a liquid outlet leading into the container.

In accordance with an added feature of the invention, there is provided a mist collector connected between the gas outlet and the stack, the mist collector having a liquid outlet leading into the container.

The outlet medium leaving the Venturi scrubber and hence having been washed can pass through a mist collector in order to filter out excess washing fluid. The washing fluid retained therein can then be returned to the washing fluid volume, along with the enriched iodine particles and aerosols therein. Subsequently, the outlet medium can be again passed through a hydraulic seal, as needed.

In accordance with an additional feature of the invention, there is provided a gas distributor disposed in the washing fluid in the container, the gas distributor being fed by the Venturi scrubber.

In accordance with yet another feature of the invention, there is provided a a mixing nozzle downstream of the gas outlet for diluting an outlet medium with ambient air.

The de-moisturized and cleaned outlet medium may be carried directly to a stack. However, an admixture of ambient air can also be provided in order to obtain further dilution of any toxic gas components. It is also possible for the Venturi scrubber to be followed by a fiber packet filter, in order to attain even better filtering effectiveness. If especially stringent requirements are involved, then superheating by throttling the outlet medium is also possible. This is favorable if there is to be an ensuing cleaning in a superfine aerosol filter, such as an "S class" metal fiber filter.

In terms of the heating of the washing fluid, the Venturi scrubber should be disposed just below the level of the fluid, for instance at a depth of 1 meter, so that it is located outside any possible boiling zone.

In accordance with yet a further feature of the invention, there is provided at least one other Venturi scrubber connected in parallel with the first-mentioned Venturi scrubber, the Venturi scrubbers being disposed at different heights in the washing fluid.

The fact that a plurality of Venturi scrubbers which are connected in parallel, that is connected to a common inlet line, are advantageously disposed at different levels, can be taken into consideration in dimensioning the column of liquid above the Venturi scrubber. This provision ensures that in the case of partial-load operation not all of the parallel-connected Venturi scrubbers operate uniformly, but instead optimal operating conditions for individual scrubbers are maintained.

In accordance with yet an added feature of the invention, there is provided a heat exchanger connected upstream of the Venturi scrubber.

The heat exchanger can be connected to the input side of the Venturi scrubber in order to vary the temperature conditions.

In accordance with yet an additional feature of the invention, there is provided a pressure maintenance and limiting device connected upstream of the Venturi scrubber.

In accordance with still another feature of the invention, the Venturi scrubber has a cooling device communicating with the washing fluid.

One variation in the temperature conditions is a cooling of the outlet medium flowing to the scrubber from the containment, so that saturated steam is produced.

In accordance with still a further feature of the invention, there is provided a pan disposed beneath the container.

In accordance with a concomitant feature of the invention, there is provided a mist collector downstream of the Venturi scrubber, a throttle downstream of the mist collector, and a high-efficiency submicron particulate filter disposed downstream of the mist collector.

Other features which are considered as characteristic for the invention are set forth in the appended claims.

Although the invention is illustrated and described herein as embodied in a nuclear power plant having a containment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is an overall simplified schematic circuit diagram according to the invention; and FIGS. 2–5 are circuit diagrams showing details of four different embodiments according to the invention.

Referring now to the figures of the drawings in detail and first, particularly, to FIG. 1 thereof, there is seen a containment 1 of a pressurized water reactor, which is conventionally constructed in the form of a steel sphere. The containment 1 encloses the primary system of a pressurized water reactor for 1300 MW$_e$, for instance. This system also includes non-illustrated steam generators, with which a thermal output of approximately 4000 MW in the form of steam are supplied to an engine room that is located beside the containment. The containment 1 is surrounded by a thick-walled concrete building, so that a second containment which is not dealt with herein, is also provided, as in the case of the pressurized water reactor in German Patent DE-PS 26 34 356, corresponding to U.S. Patent No. 4,151,689.

An outlet line 3 protrudes into the interior 2 of the containment 1. A mist collector 4 is provided on the inner end of the outlet line 3. The line 3 forms an outlet opening. In the event of a malfunction in which a negative pressure is provided, the medium effecting the negative pressure, that is, steam and gas, can be carried away through the outlet opening before the bursting pressure of the containment 1 is attained. The line 3 leads to a filter and blow-off configuration, generally identified by reference numeral 5. The structure of the filter and blow-off configuration will be described in further detail below, referring to FIGS. 2–5.

A pressure maintenance and limiting device, which is symbolized by a safety valve 6 in FIG. 1, is also connected to the line 3. In practice, the safety valve 6 may, for instance, be formed of two safety valves which are connected in series and are actuated by a special or individual medium, in order to limit the pressure in the containment to a value of 6 bar, for example. Two motor-actuated or manual shutoff valves 8 and 9 are connected parallel to line segments 7 having the safety valve 6 and are connected in series or through a separate line to the configuration 5. In an alternative structure which is shown in broken lines in FIG. 1, the line 3 can be provided with a bursting diaphragm 10, which has a response pressure of 7 bar, for example.

Figure 2:
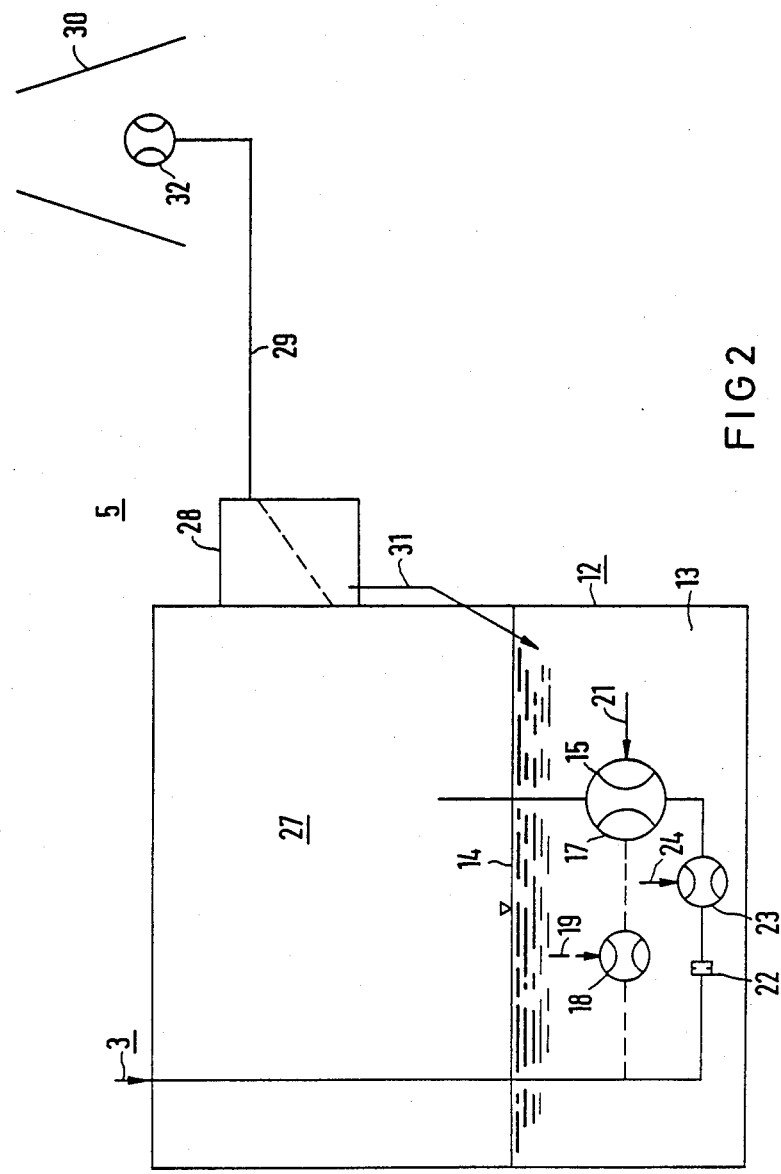

FIG. 2 shows that the line 3 leads into a container 12 that forms a substantial part of the filter and blow-off configuration 5. The lower portion of the container 12 encloses a volume 13 of washing fluid, especially water, the surface of which is indicated at reference numeral 14. The surface of the water is located at a level approximately one-half to three-quarters of the way up the container 12. A Venturi scrubber 15 in the form of a jet pump is disposed in the water volume 13. The Venturi scrubber 15 is located at least 1 meter below the surface of the water.

An intake side 17 of the Venturi scrubber 15 can be connected to the line 3 through a further jet pump 18, with which the outlet medium leaving the containment 1 can be reinforced with water, as indicated by an arrow 19. Alternatively, the water 13 is aspirated directly, as indicated by an arrow 21.

In order to reduce the temperature of the outlet medium leaving the containment 1, the Venturi scrubber 15 can be preceded by a throttle restriction 22 and a jet pump 23, which operates as a heat remover and adds water as indicated by an arrow 24. The result is saturated steam at a lower temperature, which prevents overloading of the Venturi scrubber 15. Instead of the jet pump 23, another type of heat exchanger could also be used.

The outlet of the Venturi scrubber 15 leads into a gas space 27 above the surface 14 of the water. An outlet line 29 that begins at a fluid collector or trap 28, is connected to the gas space 27 and leads into a stack 30. Liquid from the filter 28 flows through a liquid outlet 31 leading back into the volume 13 of water. The line 31 may be omitted if the filter 28 is disposed in the gas space 27 in the container 12. The container 12 can also have a cooling device, such as a cooling coil for re-cooling the washing fluid 13, and a collecting pan which prevents a release of the washing fluid in the event of leakage.

The end of the outlet line 29 facing toward the stack can be provided with a mixing nozzle 32. This primarily takes the form of a jet pump, with which ambient air is aspirated for diluting and cooling purposes.

With the Venturi scrubber 15, effective aerosol moistening and iodine absorption are attained utilizing the pressure which is already present in the containment 1. Accordingly, the retention of activity carriers is possible, with substantially less space being required than in the case of the conventional use of a mound of soil.

Figure 3:
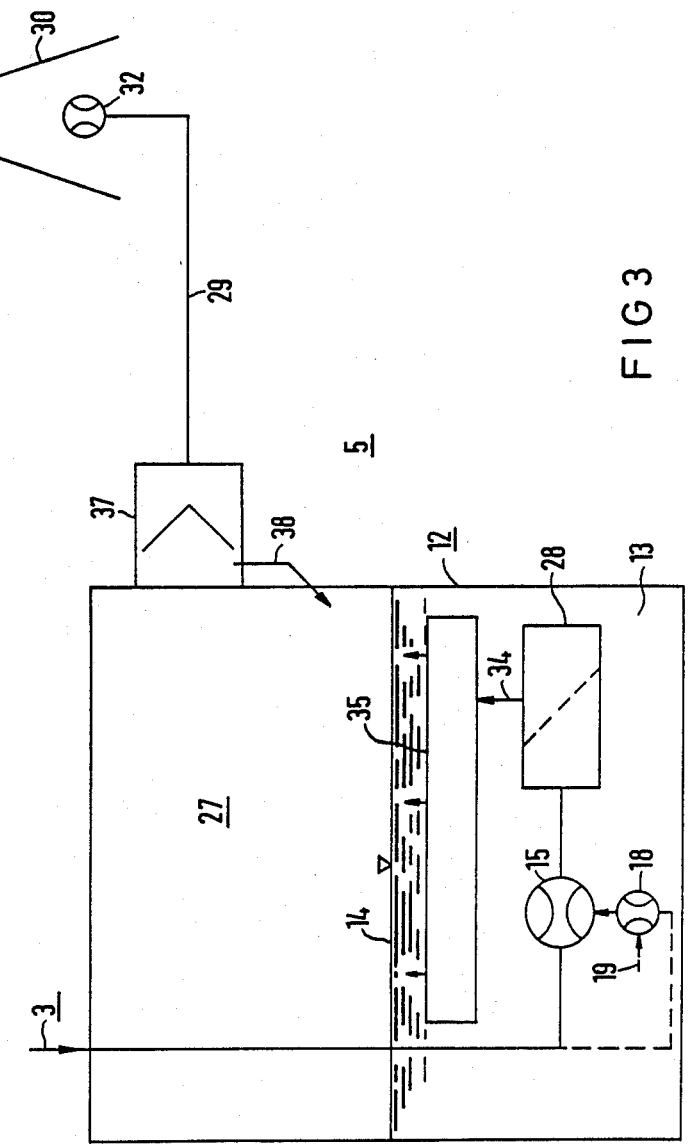

In the embodiment of FIG. 3, a mist collector 28 is located below the surface 14 of the water. The mist collector 28 is acted upon directly by the Venturi scrubber 15. The gas outlet 34 of the mist collector 28 leads to a gas distributor, 35, with which gas cleaned in the Venturi scrubber 15 is distributed uniformly over the volume 13 of the liquid. The outlet of the container 12 leads into a fiber mist collector 37, to which the line 29 is connected. The line 29 also leads through the mixing nozzle 32 into the stack 30. The moisture accumulating in the filter 37 is returned to the container 12 through a line 38.

Figure 4:
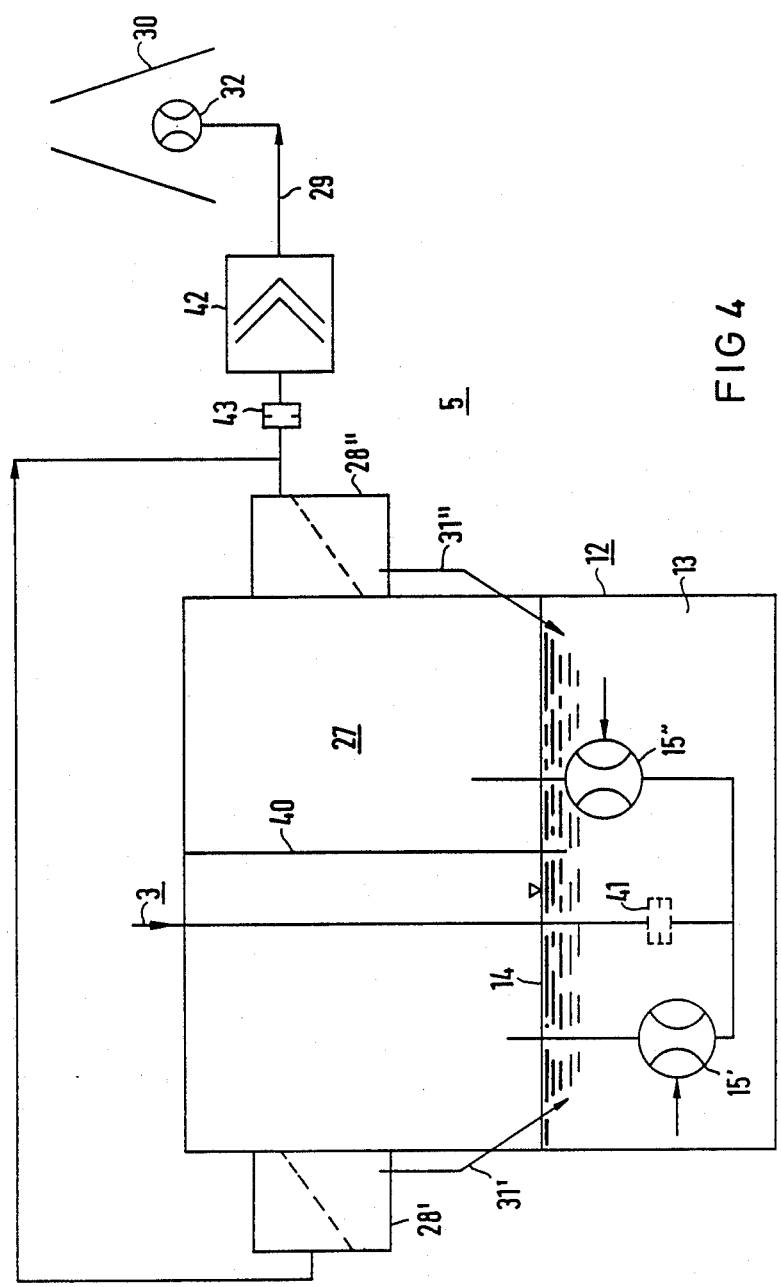

In the embodiment of FIG. 4, the gas volume 27 is divided into two zones by a partition 40 that protrudes below the surface 14 of the liquid. Two Venturi scrubbers 15' and 15" are disposed in the volume of water 13, each on a respective side of the partition 40. A throttle restriction 41 connects the scrubbers in parallel to the line 3. The Venturi scrubbers 15' and 15" are mounted at different heights below the surface 14 of the liquid. As a result, in partial-load operation the Venturi scrubber 15' that is at a lower level is more or less put out of operation, because of the higher liquid pressure. The Venturi scrubber 15" located at a higher level therefore operates under volumetrically optimized operating conditions.

The two sides of the gas space 27 lead through mist collectors 28', 28" to the outlet line 29, which is provided with a high efficiency submicron particulate air filter 42 for further cleaning of the gases and for retaining aerosols. The submicron particulate filter 42 is preceded by a throttle 43 and followed by a mixing nozzle 32.

Figure 5:
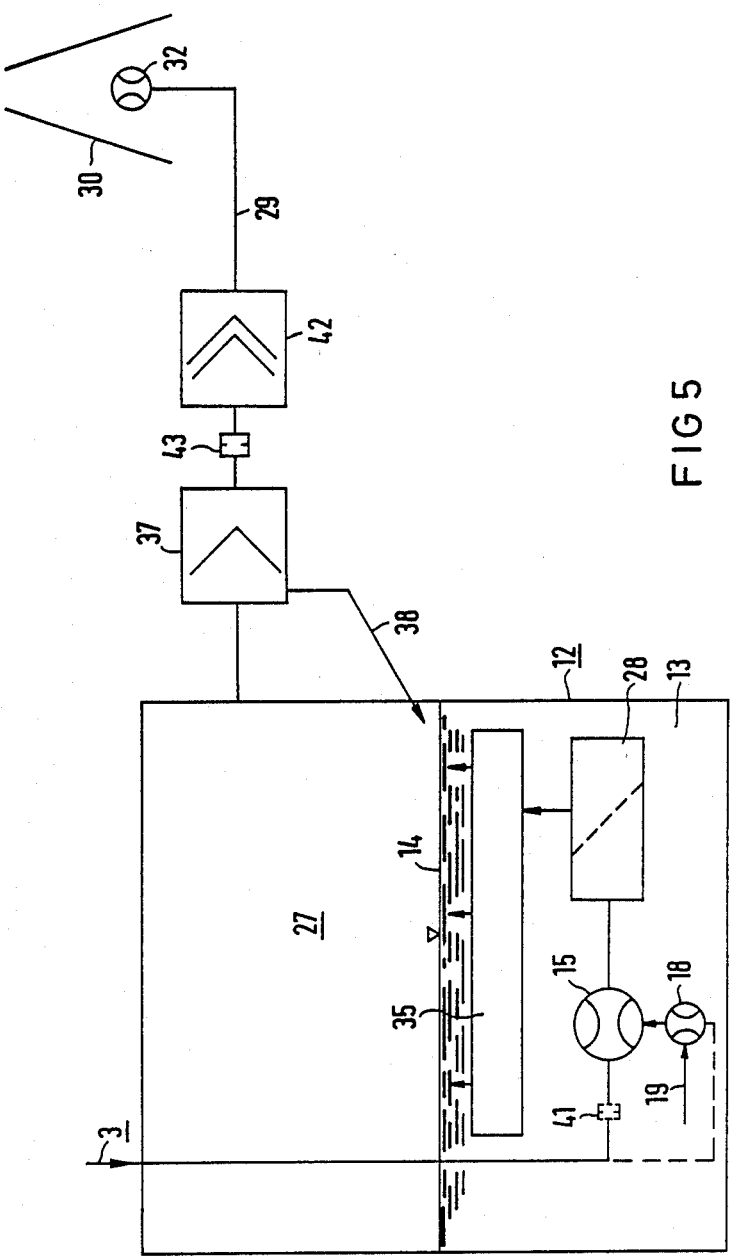

In the embodiment of FIG. 5, the outlet line 29 includes not only the fiber mist collector 37, which is equivalent to that of the embodiment of FIG. 3, but also the throttle restriction 43 and the high efficiency submicron particulate filter 42 of the kind already shown in FIG. 4. The Venturi scrubber 15 feeds the gas distributor 35 through the mist collector 28.

The foregoing is a description corresponding in substance to German Application P 36 37 795.3, dated Nov. 6, 1986, the International priority of which is being claimed for the instant application, and which is hereby made part of this application. Any material discrepancies between the foregoing specification and the aforementioned corresponding German application are to be resolved in favor of the latter.

I claim:

1. Nuclear power plant, comprising a containment for containing activity carriers, an outlet in the form of an excess pressure safety device leading out of said containment, a line connected to said outlet for directing an outlet medium from said containment, and a filter connected to said line for receiving the outlet medium, filtering activity carriers out of the outlet medium and feeding the outlet medium to the atmosphere, said filter including a container, a washing fluid disposed in and partly filling said container up to a given level, a Venturi scrubber in said container having a pressurized inlet region connected to said line and an outlet region, a mist collector disposed in said container below said given level and connected downstream of said outlet region of said Venturi scrubber, as seen in flow direction of the outlet medium, said container having a gas outlet above said given level, and a stack connected downstream of said gas outlet.

2. Nuclear power plant according to claim 1, including a gas distributor disposed in said washing fluid in said container below said given level and above said mist collector, said gas distributor receiving the outlet medium from said mist collector and distributing the outlet medium over the cross section of said container above said gas distributor.

3. Nuclear power plant according to claim 1, including another mist collector connected between said gas outlet and said stack, said other mist collector having a liquid outlet leading into said container.

4. Nuclear power plant according to claim 1, including a mixing nozzle downstream of said gas outlet for diluting the outlet medium with ambient air.

5. Nuclear power plant according to claim 1, including a jet pump upstream of said Venturi scrubber for feeding said washing fluid of said Venturi scrubber.

6. Nuclear power plant according to claim 1, including at least one other Venturi scrubber connected in parallel with said first-mentioned Venturi scrubber, said Venturi scrubbers being disposed at different heights in said washing fluid.

7. Nuclear power plant according to claim 1, including a heat exchanger connected upstream of said Venturi scrubber.

8. Nuclear power plant according to claim 1, including a pressure maintenance and limiting device connected upstream of said Venturi scrubber.

9. Nuclear power plant according to claim 1, including another mist collector downstream of said Venturi scrubber, a throttle downstream of said other mist collector, and an aerosol filter disposed downstream of said other mist collector.

* * * * *